United States Patent [19]

Dye et al.

[11] Patent Number: 4,938,054

[45] Date of Patent: Jul. 3, 1990

[54] ULTRASONIC LINEAR METER SENSOR FOR POSITIVE DISPLACEMENT METER

[75] Inventors: G. Frank Dye; John S. McSpadden, both of Greensboro, N.C.

[73] Assignee: Gilbarco Inc., Greensboro, N.C.

[21] Appl. No.: 346,904

[22] Filed: May 3, 1989

[51] Int. Cl.⁵ .............................................. G01F 25/00
[52] U.S. Cl. .......................................... 73/3; 73/239; 73/247
[58] Field of Search .................. 73/10 V, 3, 239, 240, 73/242, 243, 244, 247, 249, 250, 251, 272 R; 367/13, 118, 124, 127, 128

[56] References Cited

U.S. PATENT DOCUMENTS

| | | | |
|---|---|---|---|
| 2,121,120 | 6/1938 | De Lancey | 73/247 |
| 2,326,637 | 8/1943 | Grise | 73/247 |
| 2,743,429 | 4/1956 | Erdman et al. | 340/1 |
| 2,985,018 | 5/1961 | Williams | 73/398 |
| 3,237,150 | 2/1966 | Beck et al. | 340/1 |
| 4,008,455 | 2/1977 | Pedersen | 340/1 |
| 4,210,969 | 7/1980 | Massa | 367/108 |
| 4,228,530 | 10/1980 | Bergey | 367/112 |
| 4,229,798 | 10/1980 | Rosie et al. | 364/564 |
| 4,254,482 | 3/1981 | Newman | 367/87 |
| 4,470,299 | 9/1984 | Soltz | 73/290 |
| 4,542,652 | 9/1985 | Reuter et al. | 73/597 |
| 4,543,649 | 9/1985 | Head et al. | 367/96 |
| 4,606,015 | 8/1986 | Yamaguchi | 367/95 |
| 4,781,066 | 11/1988 | Pope et al. | 73/247 |

FOREIGN PATENT DOCUMENTS

| | | | |
|---|---|---|---|
| 152475 | 5/1979 | Japan . | |
| 0090128 | 5/1983 | Japan | 73/239 |
| 1525720 | 9/1978 | United Kingdom . | |

Primary Examiner—Robert Raevis
Attorney, Agent, or Firm—Kenneth Watov

[57] ABSTRACT

A positive displacement meter for measuring the volume of liquid dispensed over a given period of time includes at least one pair of pistons moving in counter opposition to one another within a pair of cylinders, an acoustical transducer located through a side wall of one of the cylinders, for transmitting and receiving acoustical pulses along a folded acoustical pathway, a first portion of which is transverse to the face of the piston, and a second portion of which is parallel to the axis of movement of the piston, via a wedge-shaped reflector mounted on the inside wall of the cylinder directly opposite from the acoustical transducer for so reflecting transmitted and reflected acoustical waves between the transducer and face of the piston under measurement, whereby changes in the position of the piston are detected over successive measuring periods for determining each full stroke thereof, representative of a given amount of fluid or liquid being dispensed from the meter, which volume portions are accumulated over a given dispensing period for determining the total volume of fluid dispensed.

21 Claims, 8 Drawing Sheets

ULTRASONIC LINEAR METER SENSOR FOR POSITIVE DISPLACEMENT METER

FIELD OF THE INVENTION

The present invention relates generally to fluid flow meters, and more particularly to apparatus for sensing the linear position of one or more pistons of a rotary positive displacement piston meter at different periods of time for permitting calculation of the fluid flow through the meter.

BACKGROUND OF THE INVENTION

In many known positive displacement meters the typical method of measuring the volume of fluid passing through the meter is by measuring the angular displacement of the meter. As the various mechanical mechanisms in such a meter wear over time, the length of the stroke of the pistons within the meter changes, causing inaccuracies if the angular displacement method of measurement is used. To correct for such inaccuracies as the meter ages, the meter must be periodically recalibrated to correct for increasing wear of the mechanical parts.

The present inventors recognize that in applications where a positive displacement meter is employed for fluid metering, long-term accuracy relative to prior metering systems would be enhanced by measuring the total linear distance traveled by the positive displacement device (the pistons, for example), and using such measurements to calculate the metered volume from the displacement and associated area of the displaceable device. As indicated, the displaceable device could be a piston within a cylinder, or a plurality of pistons within cylinders of a typical positive displacement meter. The accuracy of such a positive displacement meter is dependent upon the resolution of the linear measuring device. As discussed below, there are many prior systems for providing measurement of the linear displacement of a moving element.

Beck et al., U.S. Pat. No. 3,237,150, teaches the use of two transducers in an ultrasonic position indicator system for determining the position of control rods in a nuclear reactor. One transducer is used to ping a fixed target to provide a calibration signal, whereas the other transducer is used to ping a movable target. Acoustic pulses returned from the fixed target are used to provide error compensation for pulses received from the movable target, for accurately determining the position of the nuclear control rod being monitored.

Massa, U.S. Pat. No. 4,210,969, discloses an acoustic ranging system for determining the height of a liquid in a container. The system includes a reflecting target located a predetermined distance from a transducer for providing calibration signals. A microprocessor is included and programmed to provide appropriate timing for the operation of the transducer to transmit acoustical pulses to the fixed target and the surface of the liquid, in such a manner as to prevent "ghost" or false signals.

Ruter, et al., U.S. Pat. No. 4,542,652, teaches a method and apparatus for determining the location of a piston within a cylinder from the uppermost end of the cylinder. A target reflector is used in the cylinder to provide calibration signals and an accordion-like reflector attached to the top face of the piston is used to reflect measuring signals back to the transducer.

Head et al., U.S. Pat. No. 4,543,649, teaches the use of ultrasonics for detecting the position of a piston within a cylinder. In FIG. 12 of this patent a target reflector is located at a fixed position to obtain compensation signals, for correcting errors due to variations in temperature and pressure.

U.K. Patent No. 1,525,720 teaches an acoustical distance measuring system for transmitting an acoustical pulse to a piston, measuring the time for a signal to reflect back to a transducer, and computing from this measured time the distance of the piston from the transducer.

There are many other patents that disclose some form of measurement of a moving object or element. A number of such patents are of interest for background information, and include Erdman, U.S. Pat. No. 2,743,429; Williams, U.S. Pat. No. 2,985,018; Pedersen, U.S. Pat. No. 4,008,455; Newman, U.S. Pat. No. 4,415,914; Rosie et al., U.S. Pat. No. 4,229,798; Beroev, U.S. Pat. No. 4,228,530; Newman, U.S. Pat. No. 4,254,482; Soltz, U.S. Pat. No. 4,470,299; Yamaquchi, U.S. Pat. No. 4,606,015; and Japanese No. 55-152475.

SUMMARY OF THE INVENTION

A principal object of this invention is to provide an improved method and apparatus for fluid meters of the positive displacement meter type.

Another object of the invention is to provide a positive displacement meter with increased reliability and accuracy.

Yet another object of the invention is to incorporate ultrasonic linear displacement sensing in an improved positive displacement metering system.

Yet another object of the invention is to provide an improved method and apparatus for measurement in a positive displacement meter for automatically compensating for mechanical wear in the meter over time.

With these and other objects in mind, and in recognition of the problems in the prior art, a preferred embodiment of the present invention includes ultrasonic means for sensing the linear position of one or more pistons in a rotary positive displacement meter over time, and microprocessor means for calculating from the measurements made, the volume of fluid passed through the rotary positive displacement meter over a given period of time. In this manner changes in the stroke of the piston or pistons of the positive displacement piston meter are compensated for automatically.

BRIEF DESCRIPTION OF THE DRAWINGS

Various embodiments of the present invention will be described with reference to the drawings, in which like items are identified by the same reference number, which drawings are as follows.

DESCRIPTION OF THE PREFERRED EMBODIMENTS OF THE INVENTION

Figure 1:
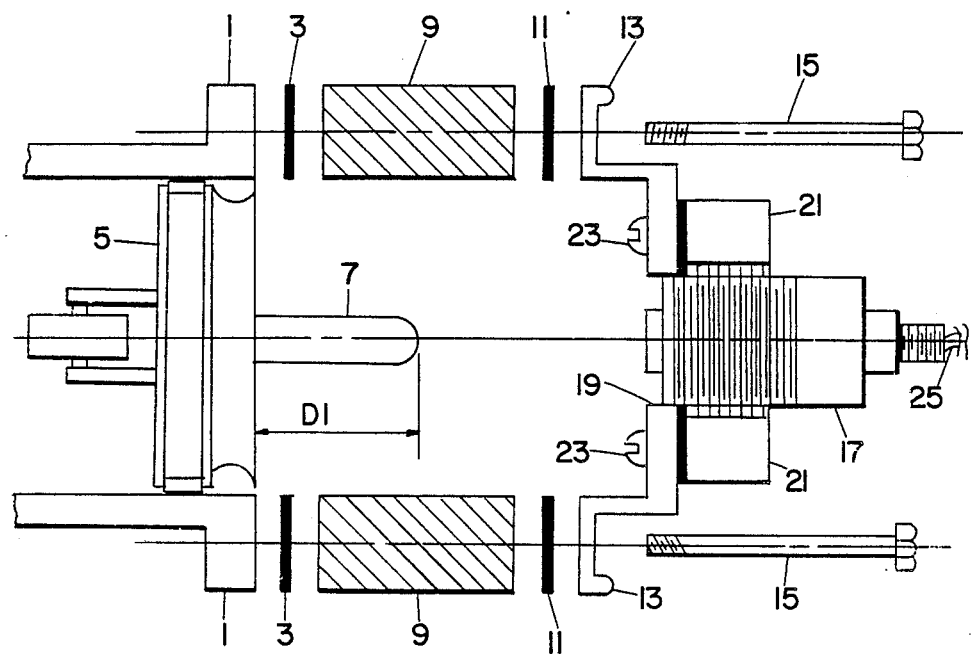
FIG. 1 shows a cross-sectional and partial pictorial view of a portion of a cylinder and piston of a rotary positive displacement piston meter employing one embodiment of the invention.

FIG. 1 illustrates an interior view of a portion of a piston within a cylinder of a modified model PA-24 rotary positive displacement piston meter manufactured by Gilbarco, Inc., Greensboro, N.C., the present assignee. The cylinder 1 and gasket 3 are standard items. The piston 5 is modified in this example to include a rod-type reflector 7 centrally located on the outward face of the piston 5. Other modifications include a spacer 9, a second gasket 11 (identical to 3), an end cover 13, retaining bolts 15, a transducer 17 centrally mounted to partially protrude into a hole 19 of the end cover 13, with the transducer 17 being secured to the end cover via mounting brackets 21 and screws 23, as shown. Electrical connections to the acoustic transducer 17 are made via a pair of electrical conductors 25. Note that the length of the rod reflector 7 represents a known distance or calibration distance "D1", as will be described in greater detail below.

Figure 2:
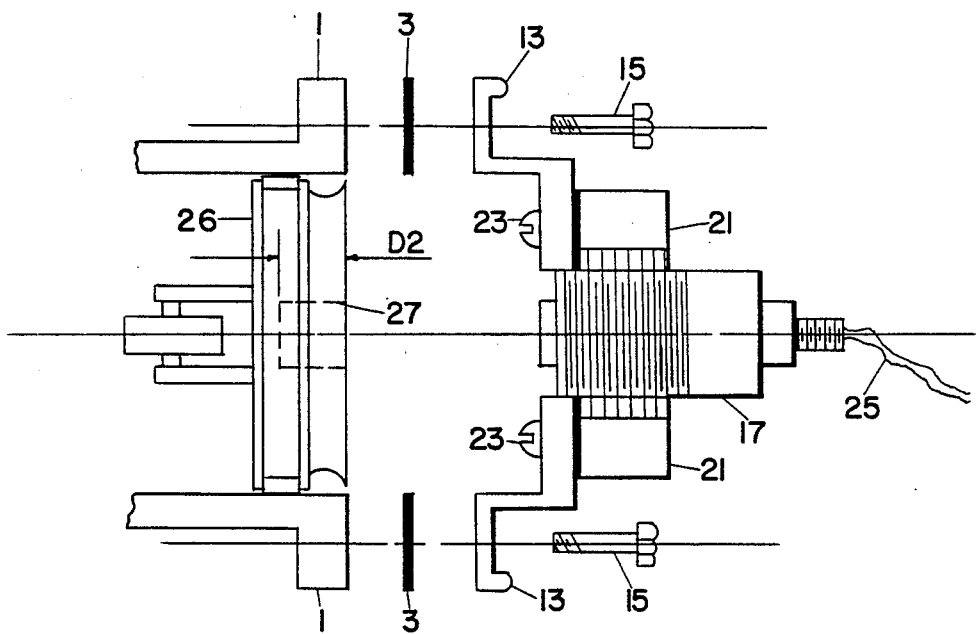
FIG. 2 shows a cross-sectional and partial pictorial view of the interior of a portion of a piston within a cylinder of a rotary positive displacement piston meter including an embodiment of the invention.

FIG. 2 is illustrative of another embodiment of the invention, similar to that of FIG. 1, but differing in that instead of using a rod-type reflector 7, a hole-type reflector 27 is employed. As shown, the hole reflector 27 is essentially located on the outer face of the piston 26. In this embodiment, the known or calibration distance "D" is represented by the depth "D2" of the hole 27. Note also, that in this embodiment the spacer 9 of the embodiment of FIG. 1 is eliminated in that no provision must be made for the length of the rod reflector 7 protruding from the piston 5. Accordingly, an advantage of the embodiment of FIG. 2 relative to that of FIG. 1, is that the former provides for more compact packaging.

Figure 3:
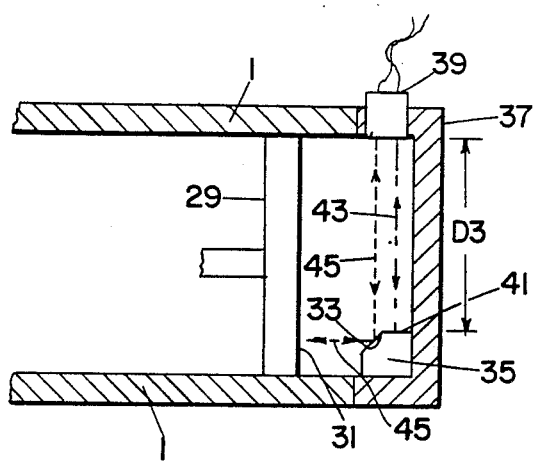
FIG. 3 is a partial cross-sectional and pictorial view of a piston within a cylinder of a rotary positive displacement piston meter including a preferred embodiment of the invention.

In FIG. 3, a third and preferred embodiment of the invention is shown that includes a piston 29 within a cylinder 1, a reflective surface 31 located near the outer circumference of the face of the piston 29, and opposite from a first reflecting surface 33 of a reflector wedge 35 mounted in an end cover 37, as shown. An ultrasonic transducer 39 is mounted through the side of the end cover 37 by appropriate means. As shown, transducer 39 is positioned on the opposite side of the end cover 37 opposing the reflector wedge 35. The reflector wedge 35 further includes a second reflective surface 41 that serves as a calibrating reflective surface 41. The distance from the calibrating reflective surface 41 of reflector wedge 35 to the face of the transducer 39 provides a known calibration distance "D3". The broken lines with interspersed arrows 43 show the acoustical wavepath for both transmitted acoustical waves from transducer 39 and reflected or echo acoustic waves returning back to the transducer 39 from the calibration surface 41. The acoustical transmitted and reflected wavepath between transducer 39, the reflective surface 33 of wedge 35, and the reflective surface 31 of piston 29 is shown by the broken lines with interspersed arrow path 45. Path 45 provides the actual measuring path for determining the location of the piston within the cylinder at any given time. The embodiment of the invention of FIG. 3 provides a folded reflector system, which minimizes the volume for providing ultracompact packaging of the mechanical components of the invention in this embodiment.

Figure 5:
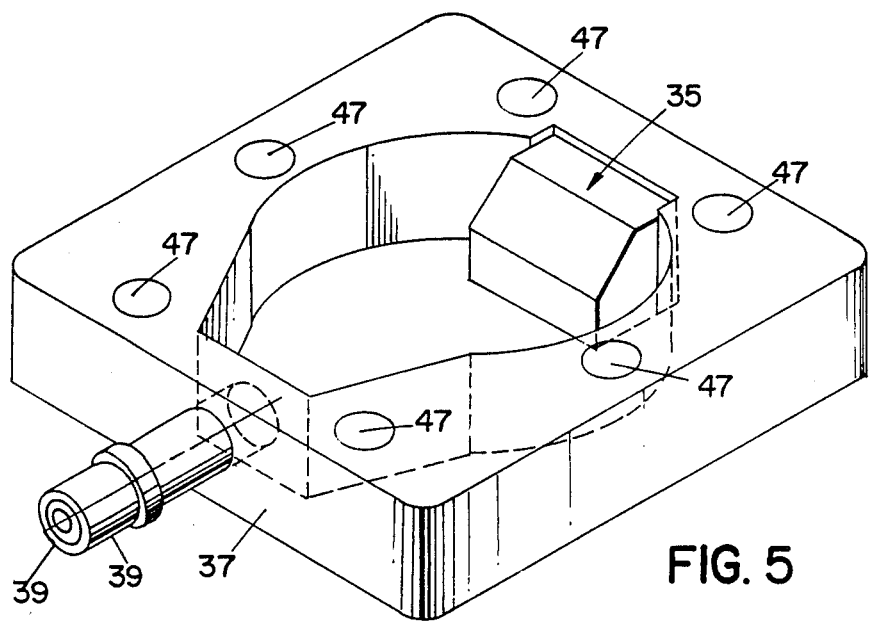
FIG. 5 is a side elevation view in perspective of an ultrasonic, cylindrical cover assembly for a preferred embodiment of the invention.

A detailed pictorial view of the end cover 37 of a preferred embodiment of the invention is shown in FIG. 5. The design of this particular example provides for minimization of secondary reflections of acoustical waves back to the transducer that might reduce the accuracy of the measuring system. Note that 6 bolt holes 47 are shown in this example.

Figure 6:
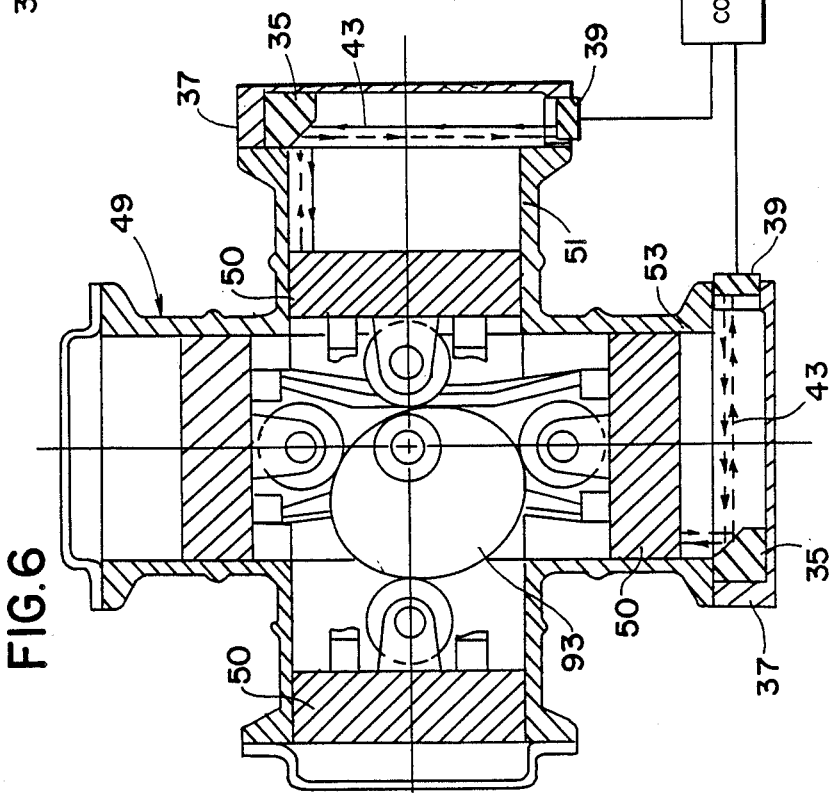
FIG. 6 is a cross-sectional illustration of a rotary positive displacement piston meter including 4 pistons arranged in quadrature, with 2 adjacent cylinders including a preferred embodiment of the invention.

A cross-section illustration of a 4 piston rotary positive displacement meter 49 is shown in FIG. 6. The meter 49 illustrates a typical installation of a folded reflector embodiment of the present invention in use in two adjacent cylinders 51 and 53, for example. An electronic controller 55 is shown coupled to the acoustic transducers 39. As will be described in detail below, the controller 55 operates the transducers 39 in both transmission and receiving modes for making the necessary measurements in order to determine the volume of fluid passing through the meter 49 over a given period of time. Note that liquid is forced under extreme pressure into a cylinder for moving an associated piston 50 in a downstroke, and when a piston 50 is moving in an upstroke, a measured amount of fluid is forced through the associated cylinder for delivery to a dispensing nozzle, for example.

Figure 7:
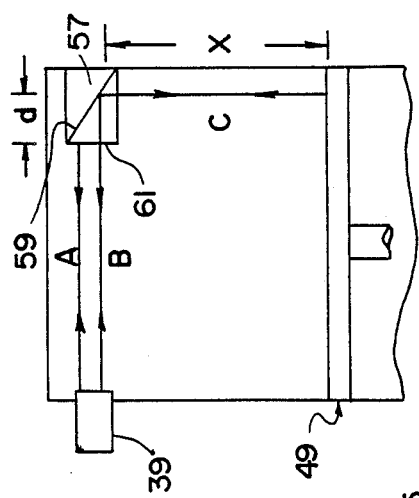
FIG. 7 is an illustration of a partial cross-sectional and pictorial view of a piston within a cylinder of a positive displacement meter employing another embodiment of the invention.
Figure 8:
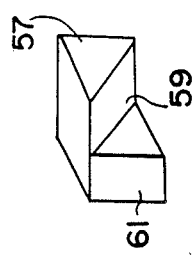
FIG. 8 is a perspective view of a reflector used in the embodiment of the invention of FIG. 7.

FIG. 7 is a simplistic illustration showing a partial cutaway and pictorial view of another embodiment of the invention using a reflector 57 having a design as shown in pictorial form in FIG. 8. In this embodiment, the reflecting block 57 includes a wedge-like portion having a reflective surface 59, and an adjacent block-like portion having a reflective calibration surface 61.

Figure 9:
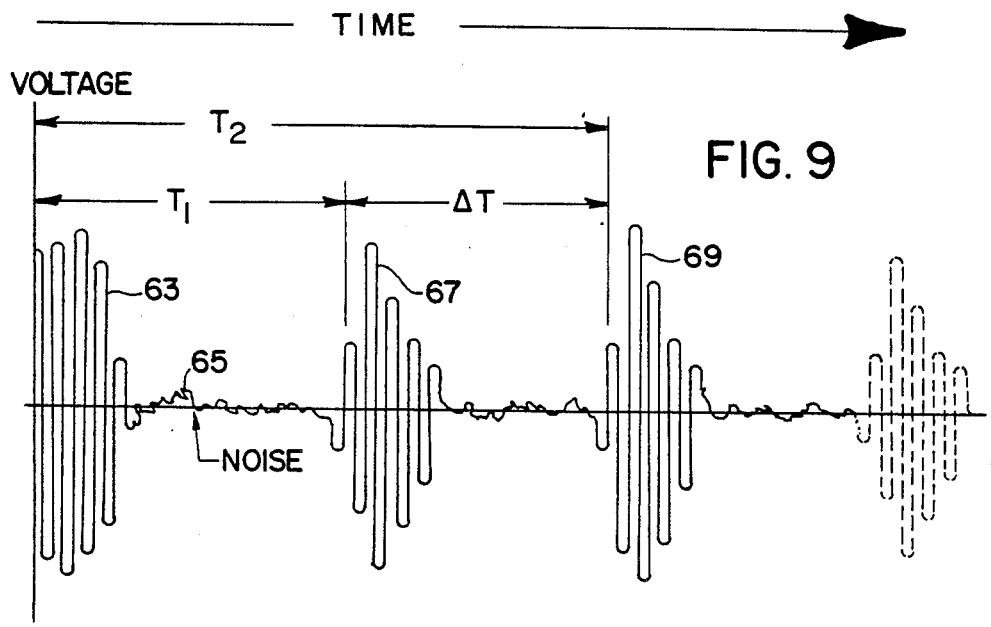
FIG. 9 is a waveform diagram showing initially transmitted acoustical pulses and resultant echo or reflection pulses of a method of operation of one embodiment of the invention.

In FIG. 9, a waveform diagram is shown of the acoustical pulses 63, 67, 69 that typically are utilized in the present invention for measuring the volume of liquid passed through the meter over a given period of time. Note that the waveforms are given for purposes of illustration only, and may vary in wave, shape and noise content in actual practice. With regard to the embodiment of the invention of FIG. 1, assume that controller 55 is operated to energize transducer 17 at a given instant in time, for causing transducer 17 to emit an acoustic pulse 63, as shown in FIG. 9. In this example, as the transmitted acoustic pulse 63 subsides in amplitude, noise signals 65 will eventually dominate the very low levels of the decaying acoustic pulse, as shown. After a period of time $T_1$ an acoustic pulse 67 will be reflected from the rod reflector 7 back to transducer 17. Transducer 17 converts the received acoustic signal 67 back into an electrical pulse, and provides the same to controller 55. At a later time from the initial transmission of the acoustic pulse 63 toward piston 5, an acoustic pulse 69 will be reflected from the face of piston 5 back to transducer 17 and converted into an electrical signal for processing by controller 55. Controller 55 is programmed to process the times of occurrence of the transmitted pulse 63, and reflected acoustical pulses 67 and 69, for determining the relative position of the piston 5 at a time substantially coincident with the time of transmission of the acoustical pulse 63. To accomplish this, the processing speed, that is the relative speed of processing for the transmission of acoustic pulse 63, receipt of reflected pulses 67 and 69, and processing time for controller 55 to determine the position of the piston 5, must all occur in a period of time relative to speed that is substantially less than the velocity of movement of the piston 5. In other words, the entire time for processing the position of piston 5 must occur so quickly that the piston will be in substantially the same position as when the measuring process began.

Continuing with the example of measuring a volume of liquid passed through a flow meter incorporating the embodiment of FIG. 1, controller 55 initially calibrates itself by subtracting $T_2$ from $T_1$ to obtain the time difference therebetween shown as delta T in FIG. 9. The time difference represents the time that it took an acoustic pulse to travel twice the known distance D1 represented by the length of the reflector rod 7. Controller 55 is programmed to divide $D_1$ by one-half the time difference delta T in order to obtain the velocity of the acoustic waves in the liquid during a given measuring period. The computed value for the acoustical velocity is then multiplied by one-half the time period $T_2$ for computing the position of the piston 5 during the given measuring cycle. Shortly thereafter, another measuring cycle is instituted, and the new position of the piston 5 is measured. Assume that the measured distance is equivalent to the distance between the piston 5 and face of the transducer 17 at any given time. As piston 5, in this example moves toward transducer 17, liquid is forced from the associated cylinder for distribution, as previously mentioned. Accordingly, by multiplying the total measured distance traveled by the piston 5 over a given dispensing cycle, by the area of the face of the piston 5, the volume of the liquid dispensed over this period of time can be calculated. Controller 55 operates to compute the volume dispensed between successive measuring cycles, and to accumulate this result in a register. If a predetermined volume of liquid is to be dispensed, controller 55 is programmed to shutdown the dispensing system when the desired volume of fluid is dispensed.

Assume that the meter 49 is similar to that shown in FIG. 6, except that the embodiment of the invention of FIG. 1 for performing the sensing of movement of piston 5 is used, rather than the embodiment of FIG. 3. Accordingly, for each opposing pair of pistons 50, as one piston 50 moves under the pressure of incoming fluid into its associated cylinder 1, the other piston 50 is forcing liquid out of its associated cylinder 1, meaning that each distance of travel of the monitored one of the pistons 50 used in each cycle to provide a measured volume is directly indicative of an amount of fluid or liquid that was dispensed between two successive cycles of measurement of the position of the measuring piston 50. If a single piston liquid dispensing meter is utilized, controller 55 must be programmed to only accumulate volumes representative of movement of the monitored piston 50 toward the transducer 17. Similarly, the other pair of pistons 50 are monitored via the use of the embodiment of FIG. 1, in this example, for monitoring the movement of one of the other pair of pistons 5 (shown as pistons 50 in FIG. 6).

Assume that instead of using the embodiment of FIG. 1 for measuring the position of a piston 5 over each measuring cycle, that the embodiment of FIG. 2 is used. In this case, with reference to FIG. 9, the time $T_1$ represents the time period for transducer 17 to transmit acoustic pulse 63 toward the piston 5 and receive a reflected pulse 67 from the face of the piston 5. The time period $T_2$ represents the time for the transducer 17 to transmit acoustic pulse 63 and receive back a reflected pulse 69 from the bottom of the hole 27 centrally located on the face of the piston 5, in this example. Accordingly, the difference in time delta T between $T_2$ and $T_1$ represents the time for an acoustic pulse to cover a distance that is twice that of the depth D2 of the hole 27. By dividing one-half of this time difference delta T into the known distance twice D2, the speed of sound in the liquid is determined for the measuring period, as previously described. Next, controller 55 is programmed to multiply one-half the period of time $T_1$ by the measured velocity, in order to determine the position of the piston 5 from transducer 17, during each given cycle of measurement. Successive cycles of measurement are made by controller 55, as previously described, for determining the volume of liquid dispensed.

Assume that the embodiment of FIG. 3 is incorporated in the meter 49 of FIG. 6. With reference to the acoustical signals of FIG. 9, and FIG. 3, the period of time $T_1$ represents the time for an acoustical pulse to cover twice the known distance D3. Accordingly, the meter 49 is calibrated by dividing the distance D3 by one-half the value of time period $T_1$ for obtaining the acoustic velocity during the measuring period. The period of time $T_2$ represents the relative positioning of piston 29 to transducer 39. By multiplying one-half this time period $T_2$ by the calculated acoustical velocity, the relative distance of piston 29 is determined. By measuring the changes in this relative distance of the piston 29 over successive measuring periods at a frequency that is substantially high relative to the equivalent velocity of the piston 29, the volume of liquid dispensed can be determined, as previously mentioned.

Assume that the fourth embodiment of the invention of FIGS. 7 and 8 is used for measuring the volume of liquid dispensed in the meter 49 of FIG. 6. With reference to FIG. 9, the time period $T_1$ represents twice the time required for an acoustic signal to travel the distance "A". By dividing the known distance "A" by one-half of $T_1$, the velocity of the acoustic wave in the liquid during the measuring cycle is determined. The time period $T_2$ represents the time for an acoustic wave to travel twice the distance "B+C". Controller 55 then multiplies one-half $T_2$ by the computed acoustic velocity for obtaining the relative distance (B+C). Assume that the distance "d" shown in FIG. 7 is predetermined. By programming the controller to subtract the quantity (A+d) from (B+C), the distance "X" of the piston 49 of FIG. 7 from a predetermined point on wedge reflector 57 can be determined. By measuring the changes in the position of the piston 49, over a given dispensing cycle, the volume of liquid dispensed is calculated via controller 55, as previously described.

Figure 4:
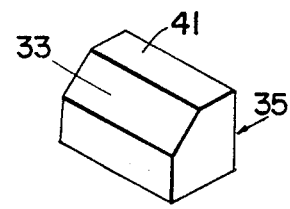
FIG. 4 is a pictorial perspective view of a reflector wedge of a preferred embodiment of the invention.
Figure 10:
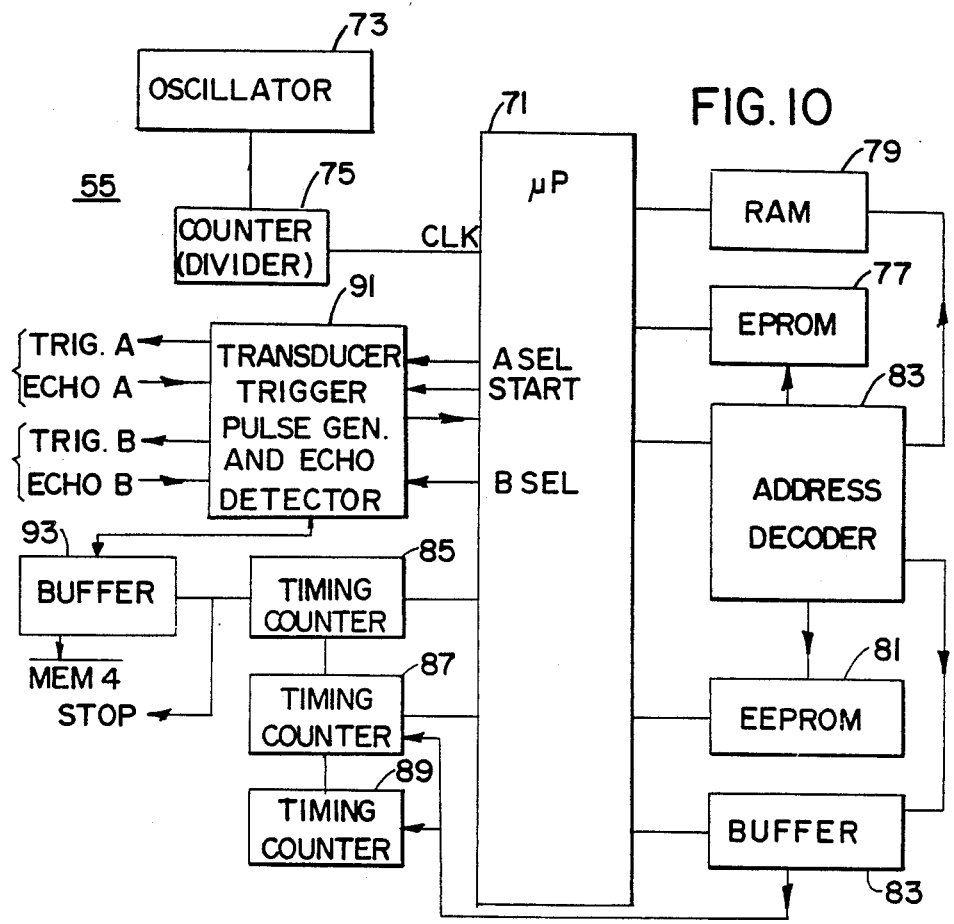
FIG. 10 is a blocked schematic diagram of an electronic control system of one embodiment of the invention.

In a prototype system built and tested by the present inventors, the folded reflector 35, shown in FIGS. 4 and 5, was included in the prototype. The modified meter 49 was configured as shown in FIG. 6. A block diagram of the controller 55 is shown in FIG. 10. The controller 55 is designed around a Z80B microprocessor 71. In the illustrative prototype, the microprocessor 71 is operated at a clock speed of 4.9152 MHz. The clock signal is generated from a 19.6608 MHz oscillator 73, whereby the output from the oscillator 73 is divided down by a counter (divider) 75, for obtaining the desired clock signal. In this example, the clock frequency was chosen to provide sufficient operating speed for microprocessor 71, and the necessary system resolution for measuring movement of the pistons being monitored by the system. Obviously, a range of clock frequencies may be used to drive the microprocessor 71, and to obtain the necessary system resolution.

An erasable programmable memory (EPROM) 77 provides 4,000 bytes of programmable memory 77. A random access memory (RAM) 79 provides 2,000 bytes of memory. Another memory, an electrically erasable programmable memory (EEPROM) 81 is included as shown.

An address decoder 83 is included for permitting the microprocessor 71 access to the EPROM 77, ram 79, EEPROM 81, and BUFFER 83 for loading and reading- ti counters 85, 87, and 89. A transducer trigger pulse and echo detector module 91, provides microprocessor 71 with the ability to trigger or drive a pair of sonic transducers 39, and receive back reflected acoustical pulses, for use in calculating the position of the pistons 50, for example, over successive periods of time, for determining the volume traversed by pistons in delivering liquid to a dispensing point. Also, another buffer chip 93 is included for loading the timing 85, 87 and 89, whereas buffer 83 is included for reading t timing counters 85, 87 and 89. Note that the E EPROM 81 is included for maintaining the calibration factor for the meter 49, even if power is interrupted.

Figure 11:
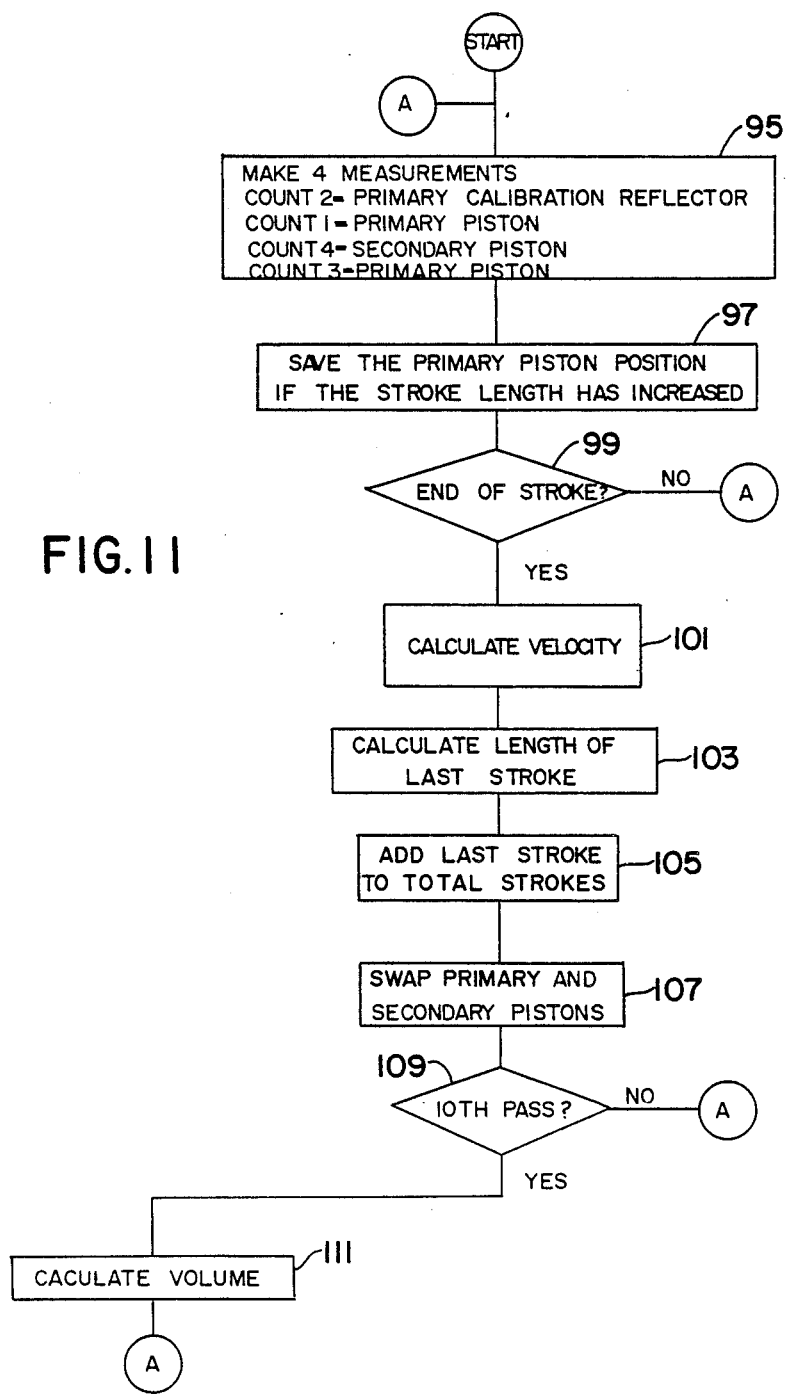
FIG. 11 is a flow chart showing the main program for one embodiment of the invention.

In FIG. 11, a flow chart is shown for the programming of the operation of the controller 55 (see FIG. 10). As previously described, the illustrative meter 49 of FIG. 6 includes an ultrasonic transducer 39 built into a cylinder cap 37, for each pair of pistons 50, as shown. With reference to FIG. 10, a trigger signal "TRIG. A" is applied to one of the transducers 39, at an appropriate time ("SEL" time) for driving that transducer to emit a sonic pulse 63, as previously described. A "TRIG.B" signal line is also connected to the other transducer 39, in response to a "B SEl" signal, for energizing that transducer 39 at the appropriate time. The trigger circuit 91 operates to excite the transducers 39 in response to the "A SEL" and "B SEL" signals. The times for the reflected pulses 67 and 69 to be received back and the calibration for the speed of sound in the liquid at the time of measurement, are made as previously described. In the meter 49, the piston pairs 50, 50, that is the opposing pistons 50, move cyclically to one another in a 90 degree phase relationship that is maintained via a common cam 93. For each piston pair, the one of the pistons 50 approaching an end of stroke (moving upward) is designated as the primary piston 50, whereas the other piston 50 is designated as a secondary piston. Upon determining that the primary piston has ended its upward stroke, and is beginning a downward stroke, the designations are reversed. In other words, as shown in FIG. 6, one piston 50 of each pair of pistons is monitored via the ultrasonic measuring system of the present invention. When one of these pistons is moving upward, the other of the monitored pistons 50 is moving downward. The upward moving one of the pistons 50 is always designated as the primary piston.

In each cycle of measurement, for meter 49, via operation of controller 55, four measurements are made in a given cycle of operation. These measurements are made in step 95 of the flow chart of FIG. 11. As indicated, the first measurement made is designated "COUNT 2", which measurement is for calibrating the velocity of sound in liquid during measurement of the primary piston position. The next measurement designated as "COUNT 1" is for measuring the time for the ultrasonic wave to reflect back from the primary piston 50 to the ultrasonic transducer 39. The third measurement designated as "COUNT 4" is for measuring the time that it takes an acoustic waveform to travel from the secondary piston 50 back to its associated transducer 39. The fourth measurement designated as "COUNT 3" is for again measuring the time for an acoustic wave to travel from the primary piston back to the associated transducer 39.

The first measurement made is the calibration measurement, partly because a relatively wide window can be utilized in that the ultrasonic reflected wave associated with the calibration is the first received, before any other reflections can cause errors in reading the reflected wave for the calibration measurement. After the calibration measurement, the position of the primary piston 50 is measured. The measurement for the secondary piston 50 is required in determining the volume dispense, and also to determine if the flow is in a forward direction, since that cannot be determined from the primary piston 50, if the latter is near the end of its stroke. Note also that two measurements are made for obtaining the position of the primary piston 50, because the accuracy in determining the most extended position of the piston 50 being measured, is dependent on the time intervals between measurements. In this regard, in the illustrative prototype system the measurements are made every 1.25 milliseconds.

In the illustrative system, one set of four measurements are always used to process the data. Also, note that if only one transducer 39 is used in the system for measuring the total liquid dispensed, for an initial period of time accurate measurements could be obtained for the fluid volume flow, and also such a one transducer system would compensate for wear of the pair of pistons associated with the transducer 39, but no compensation would provided for the other pair of pistons 50. In order to obtain full compensation for wear of each pair of pistons 50 in the measurement of the volume flow of liquid through the meter 49, the use of a second transducer 39 and associated reflector 35, is required, as shown in FIG. 6.

The next step in the flow chart of FIG. 11 is step 97, for determining if the primary piston 50 is further extended than previously measured in the previous cycle of operation. If the stroke length has increased, then the value of the position of the associated primary piston 50 is stored in RAM 79. In this manner, the position of the primary piston 50 is captured at the very top or bottom of its stroke, whereby after the piston 50 has passed the end of a particular stroke, the maximum extension can be used to determine the full length of movement of the associated piston 50 to that particular fully extended position. Each stroke of the piston 50 is measured, for example.

In step 99, the axial position of the associated primary piston 50 is calculated to determine if the end of stroke has occurred. This is accomplished by detecting when the secondary piston 50 has crossed the center of its stroke. Such a detection of a center line crossage is made by programming controller 55 to sense the length of time it takes for a transmitted acoustic pulse from transducer 39 to return back to the transducer from a reflection off of the face of piston 50, which time corresponds to the piston 50 being at the center of its stroke. However, the positions of both the primary and secondary pistons 50 are analyzed in order to provide a small axial delay, and also to provide hysteresis, in order that the primary and secondary piston 50 designations do not reverse, if the flow begins to reverse.

If an end of stroke 99 has occurred, the new stroke is added to the contents of RAM 79 carrying the total of the previous strokes for the primary piston 50. Since the next end of stroke does not occur immediately, sufficient time is available for performing a velocity calculation, whereafter the primary and secondary pistons 50 are swapped or reversed. The volume is calculated after every tenth such set of four measurements. These last steps are shown as steps 101, 103, 105, 107, 109, and 111, in FIG. 11.

The meter 49 is calibrated by pushing a ZERO and "Switch" (not shown) for dispensing exactly five gallons of liquid, whereafter a CALIBRATE switch (not shown) is activated. The calibration factor is stored in the EEPROM 81 (see FIG. 10). Note that the advantages gained in the present invention in comparison to known prior fluid flow meters, is that the flow measurements remain accurate even as the stroke of the pistons 50 increases due to wear of the meter 49. Note that in the illustrative prototype system, a total stroke length for each one of the pistons 50 is equivalent to a volume of liquid in units of 0.001 gallons.

Figure 12:
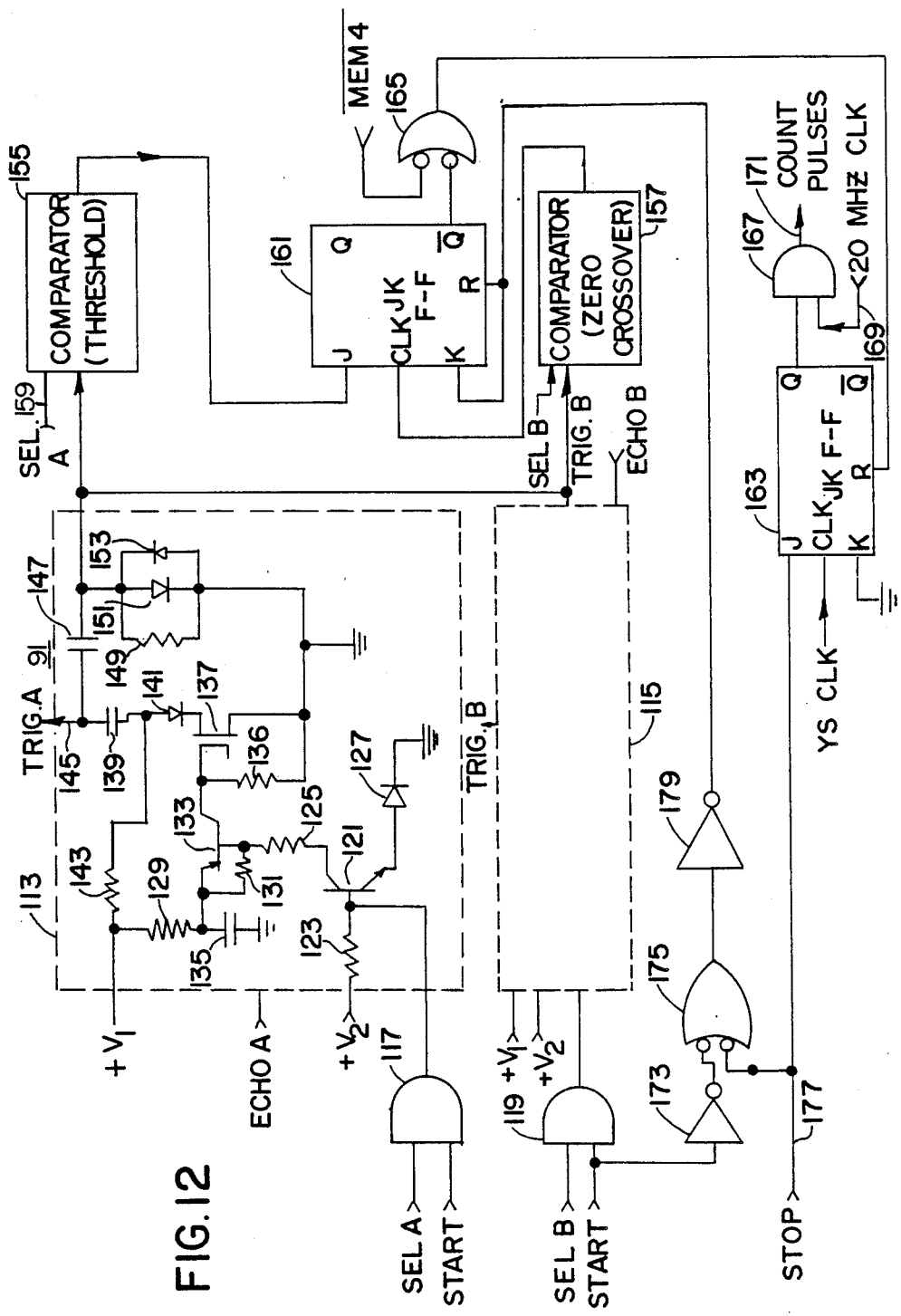
FIG. 12 is block and schematic diagram showing logic and various discrete components of a portion of the electronic processing system for one embodiment of the invention.

A portion of the Transducer Trigger Pulse Generator and Echo Detector 91 (see FIG. 10) is shown in FIG. 12. The pulser circuits 113 and 115 operate to provide a control pulse to an associated one of the ultrasonic transducers 39, for causing sonic energy to be transmitted from the associated transducer 39. The return echo or reflected ultrasonic wave is also received by the same circuit. In order for a "TRIG.A" or "TRIG.B" pulse to be generated from pulser circuits 113 and 115, respectively, AND gates 117 and 119 must each be gated on for at least 10 microseconds. In other words, the "SEL A" and "START" lines to AND gate 117 must be high for at least 10 microseconds. Similarly, the "SEL B" and "START" signal lines must each be high at AND gate 119 for at least 10 microseconds. Note that the circuitry of trigger circuit 115 is substantially identical to that of trigger circuit 113.

With reference to the trigger circuit of 113, assume that AND gate 117 has been gated on for the required 10 microsecond duration. As a result, NPN transistor 121 will be turned on via the base bias received from both the output of AND gate 117, and the bias voltage $+V_2$ coupled to the base via of transistor 121 by input resistor 123. When transistor 121 turns on, the impedance between its collector and emitter electrodes substantially decreases for connecting resistor 125 to ground via diode 127. Also when transistor 121 turns on, current flows through the series-connected circuit of a supply voltage $+V_1$, resistor 129, resistors 131 and 125, the collector-emitter current path of transistor 121, and the forward conduction current path between the anode and cathode electrodes of diode 127 to a source reference potential, ground in this example. Also, base current is now permitted to flow through PNP transistor 133, turning on the latter. PNP transistor 133 remains turned on only for the period of time necessary for discharging capacitor 135, for insuring that the pulse width of the resultant "TRIG.A" pulse is relatively short in duration. Note that when transistor 133 is turned off, capacitor 135 recharges to a voltage approaching $+V_1$ via the current path provided by resistor 129. When transistor 133 so turns on, the impedance between its collector and emitter electrodes substantially decreases for applying a positive voltage to the gate electrode of FET 137, turning the latter on. When transistor 137 so turns on, capacitor 139 discharges to ground via the current path provided by diode 141 and the main current path between the drain and source electrodes of FET 137. Note that when FET 137 turns off, capacitor 139 will recharge via resistor 143 to a voltage approaching that of the supply voltage $+V_1$. Note, resistor 136 connects the gate of FET 137 to ground.

Output line 145 for the "TRIG.A" pulse is applied to the appropriate one of the transducers 39 via a pulse transformer (not shown) that provides impedance matching, and intrinsic safety at the location of the associated transducer 39. Diode 141 permits the resonant action of the associated transducer 39 to drive the junction between capacitor 139 and resistor 143 below ground, thereby taking advantage of the resonant nature of the associated transducer 39. The signal line 145 also provides the "ECHO A" signal received by the associated transducer 39, to the echo detection portion of the circuit 113. The echo signals are coupled via capacitor 147 through the parallel network of resistor 149 and diodes 151 and 153, and to the comparator 155, as shown. The parallel network of resistor 149, and diodes 151 and 153, clips the echo signal to about 0.6 volt peak, for insuring that comparator 155 is not overdriven. Similarly, the same circuitry in the echo detection portion of circuit 115 prevents comparator 157 from being overdriven. The level of the output signal from comparator 155 changes state when the echo signal, "ECHO A" in this example exceeds 0.25 volts along the "SEL.A" signal line connected to the other input line 159 of comparator 155. The change in state of the output level of comparator 155 triggers the "J" input of the JK flip flop 161, causing the not Q output to go low for resetting the JK flip flop 163 via NOR gate 165. When JK flip flop 163 is so reset, its Q output goes high, priming AND gate 167 for gating through 20.0 MHz clock signals provided at its input line 169. The count pulses are provided at the output line 171 of AND gate 167 for application to the appropriate one of the timing counters 85, 87 and 89.

When the received echo signal has a ZERO crossing, comparator 157 detects the same, and changes its output state for applying a pulse to the "CLK" terminal of JK flip flop 161, causing the not Q output terminal to go high, in turn causing flip flop 163 to reset for gating off AND gate 167, terminating the count pulses along line 171, thus terminating count pulses to the timing counters 85, 87 and 89. The circuit of trigger/echo circuit 115 operates in an identical manner as that of the trigger/-circuit 113, except that the former is associated with the other transducer 39 designated as the "B" selected transducer.

Note that the START signal is applied through an inverter 173 to one input of a NOR gate 175. The other input to NOR gate 175 is coupled to a "STOP" signal line 177, which line is also applied to the J input terminal of JK flip flop 163. Note also that a "YS CLK" signal is applied to the clock (CLK) terminal of JK flip flop 163. The "YSCLK" is used to properly sequence the start and stop of the timing circuit. Also, the output of NOR gate 175 is coupled via an inverter 179 to both the reset and clock terminals of JK flip flop 161. Through this action a detected return pulse is sensed and clocks the JK flip-flop 161 in order to stop the timers. Lastly, note that NOR gate 165 also receives on its other input terminal a MEM 4 signal which inhibits the shuddering of the timer by noise when the ultrasonic pulse is created.

Figure 13:
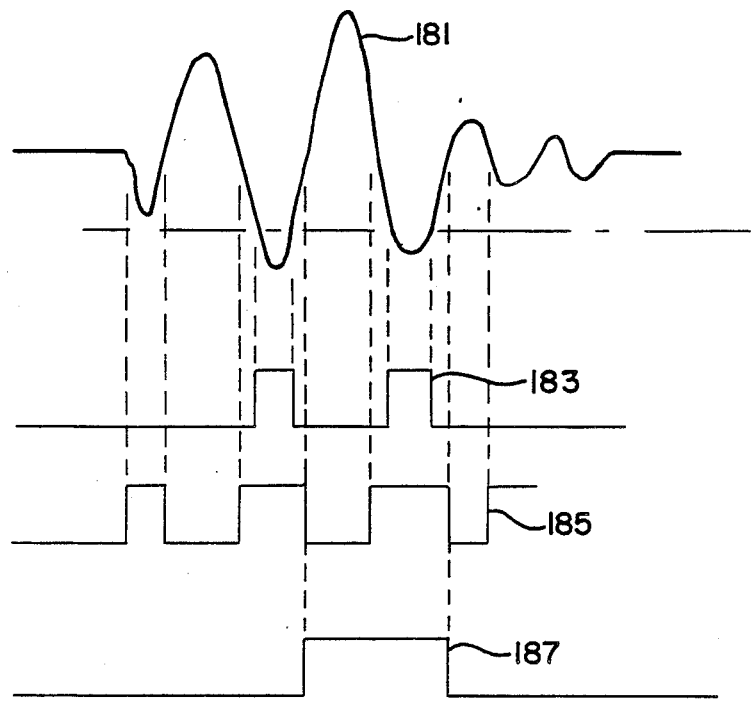
FIG. 13 is a waveform diagram including a timing chart for illustrating a portion of the operation of the electronic control system of FIG. 12.

In FIG. 13, waveforms associated with a typical echo return signal 181 are shown. The pulse waveform 183 represents the output signal from comparator 155 to the J input terminal of flip flop 161. The third pulsed waveform 185 represents the output from the ZERO crossover comparator 157 applied to the clock terminal of JK flip flop 161. And the last waveform 187 shows the detected pulsed output from the not Q terminal of the JK flip flop 161. Note that the output of the threshold comparator 155 does not go positive until such time that the echo 181 attains an amplitude that is greater than the 0.25 volt, in this case a negative amplitude. Once a threshold pulse 183 occurs, the next occurring trigger pulse 185 from comparator 157 will cause the JK flip flop 161 to change state. This results in the output pulse 187 for resetting the START JK flip flop 163, for either initiating or terminating a particular count sequence. For example, with regard to the trigger/echo circuit 113, when a trigger pulse "A" is generated, the resultant output pulse 187 will start the counting of pulses at the appropriate one of the timing counters 85, 87 and 89, which count will continue until an echo pulse is received back, that results in another pulse 187 being generated for resetting flip flop 163, causing the counter pulses at output line 171 of AND gate 167 to be terminated. Note that multiple echoes are received for each ultrasonic burst sent out. The first echo that returns is seen in FIG. 9 as $T_1$, and is the echo from a target of a known distance. $T_1$ is used to reference the speed of sound in the fluid medium by using a known distance. $T_2$ is the time of the return echo for the intended piston target. Note that after $T_2$, there are other noise reflections which are ignored.

Various embodiments of the present invention have been presented for purposes of illustration, and are not meant to be limiting in the various modifications in alternative constructions may be made without departing from the spirit and scope of the invention as covered by the appended claims, which claims are meant to include all such modifications and alternative embodiments.

What we claim is:
1. A system for real-time measurement of the volume of liquid passing through a metering pump prior to delivery to a nozzle, said metering pump including at least one piston that moves on a downstroke within a cylinder, when liquid is forced under external pressure into said cylinder, and delivers a measured amount of liquid to said nozzle on an upstroke of said piston, said system comprising:
   first transducer means mounted upon an uppermost portion of a sidewall of said cylinder, for transmitting and receiving signals along a signal path transverse to the longitudinal axes of said piston and cylinder;
   first signal reflecting means rigidly mounted within said cylinder opposite said transducer means and in alignment with the transverse signal path, for reflecting said signal from said transducer means downwardly along a path substantially parallel to the longitudinal axis of said piston;
   second signal reflecting means located upon the face of said piston, for both receiving the signal from said first signal reflecting means and reflecting the signal back thereto, said first signal reflecting means thereafter serving to further reflect the signal returned from said piston back to said first transducer means; and
   control means connected to said transducer means for periodically energizing said transducer means for transmitting a signal, said control means including receiving means for receiving return signals from said first and second reflecting means via said first transducer means, for both calculating and indicating the volume or amount of fluid being metered through said metering pump analogous to the volume displaced by said at least one piston during the times between periodic energization of said transducer means.

2. The system of claim 1, wherein said metering pump further includes first and second pairs of opposing cylinders, and first and second pairs of opposingly reciprocating pistons within said first and second pairs of opposing cylinders, respectively, said system further including:
   said first transducer means mounted upon an uppermost portion of a sidewall of one of said cylinders of said first pair of cylinders;
   said first signal reflecting means rigidly mounted within said one of said cylinders of said first pair of cylinders opposite said first transducer means;
   said second signal reflecting means located upon the face of the one of said first pair of pistons within said one of said cylinders of said first pair of cylinders;
   second transducer means mounted upon an uppermost portion of a sidewall of one of said second pair of opposing cylinders, for transmitting and receiving signals along a signal path transverse to the longitudinal axis of the one of said second pair of pistons within said one of said cylinders of said second pair of cylinders;
   signal reflecting means rigidly mounted within said one of said second pair of opposing cylinders opposite said second transducer means and in alignment with the associated transverse signal path, for reflecting a signal from said second transducer means downwardly along a path substantially parallel to the longitudinal axis of said one of said second pair of pistons;
   fourth signal reflecting means located upon the face of said one piston of said second pair of pistons, for both receiving the signal from said third signal reflecting means and reflecting the signal back thereto, said third signal reflecting means thereafter serving to further reflect the returned signal back to said second transducer means; and said control means being further connected to said second transducer means, and further including means for periodically energizing said first and second transducer means for causing each to transmit a signal, said receiving means further including means for receiving the return signals from said first and second transducer means, for both calculating and indicating the volume of fluid being metered through said metering pump analogous to the volume displaced by said first and second pairs of pistons during the times between periodic energization of said first and second transducer means.

3. The system of claim 1, wherein said first transducer means consists of an ultrasonic transducer.

4. The system of claim 2, wherein said first and second transducer means each consist of an ultrasonic transducer.

5. The system of claim 1, wherein said first signal reflecting means includes first and second reflecting surfaces, said first reflecting surface being parallel to a face of said first transducer means, for reflecting a signal back to said first transducer means along a signal path of predetermined fixed length, thereby providing a calibration signal for calibrating said system for substantially eliminating errors due to variations in the velocity of said signal through said liquid, said second reflecting surface being at a predetermined angle to both the signal path between it and the face of said first transducer means, and the signal path between it and said piston.

6. The system of claim 5, wherein said first signal reflecting means further includes a "wedge like" block with said first and second reflecting surfaces being adjacent one another.

7. The system of claim 1, wherein said second signal reflecting means includes a portion of the face of said piston that is substantially perpendicular to the associated signal path.

8. The system of claim 1, further including cover means for covering the outermost end of said cylinder, said cover means further including means for mounting at opposite ends therein said first transducer means and said first signal reflecting means.

9. The system of claim 1, wherein said control means includes a microprocessor.

10. A method for real time measurement of the volume or quantity of liquid passing under pressure through a metering pump prior to delivery to a nozzle, said metering pump including at least one piston that moves on a downstroke within a cylinder when liquid is forced under pressure into the cylinder, and moves on an upstroke for delivering a measured amount of liquid to said nozzle from said cylinder, said method comprising the steps of:
periodically transmitting an acoustical signal along a path transverse to the longitudinal axis of said piston at an uppermost portion of the interior of said cylinder;
reflecting said signal from its transverse path downward along a path intersecting a top face of said piston;
reflecting a portion of said signal as a return signal from the face of said piston along a return path parallel to the longitudinal axis of said cylinder;
reflecting the return signal near an uppermost portion of said cylinder along a path transverse to the longitudinal axis of said cylinder;
detecting said return signal along its transverse return path at the location of a source of said acoustical signal;
measuring the time difference between the times for successive pairs of transmitted acoustic signals to be reflected and detected; and
calculating from the measured time differences the volume displacement of said piston in reciprocating within said cylinder between successive transmitted signals, the volume being equivalent to the liquid delivered to said nozzle during the time interval represented by said time difference.

11. The method of claim 10, further including the steps of:
reflecting another portion of said acoustical signal from a reflecting surface located at a predetermined point within said cylinder back along a path adjacent and parallel to the transverse path, for providing a calibration signal;
detecting said calibration signal at the location of said source of said acoustical signal; and
using said calibration signal in said calculating step for substantially eliminating errors in said volume calculation due to variations in the speed of sound in said liquid over the measurement period.

12. In a rotary positive displacement piston meter for metering or measuring the volume of fluid dispensed from a dispensing system, said rotary positive displacement piston meter includes first and second pistons mounted within first and second opposing cylinders, respectively, and third and fourth pistons mounted within third and fourth opposing cylinders, respectively, said first and second pistons reciprocating in opposition to one another within their respective cylinders, and said third and fourth pistons reciprocating in opposition to one another within their respective cylinders, each of said first through fourth pistons move in a downstroke when fluid under external pressure is forced into their respective cylinder, and in an upstroke for forcing fluid out of their respective cylinder for dispensing, the total volume displaced by the pistons within respective cylinders during a given dispensing cycle being equivalent to the total volume of fluid dispensed, wherein the improvement comprises:
first ultrasonic detection means mounted within either said first or second cylinder for periodically providing successive first and second displacement signals indicative of the displacement of at least said first and second pistons within said first and second cylinders, respectively, between the times of occurrence of said first and second displacement signals as said pistons reciprocate therein over a given dispensing cycle;
said first ultrasonic detection means including a first ultrasonic transducer mounted in an outermost side of the associated said first or second cylinder, for transmitting and receiving acoustic signals along a first signal path transverse to the longitudinal axis of the associated said first or second piston, and reflector means for establishing a signal path between said first ultrasonic transducer means and the associated one of said first or second piston;
said reflector means being mounted within the associated said first or second cylinder, and including a first reflector mounted on the side wall of the associated said first or second cylinder opposite said ultrasonic transducer, for reflecting transmitted signals from said first signal path to a second signal path parallel to the longitudinal axis of said associated piston, and a second reflector on the face of said associated piston for reflecting the signals back along said second signal path to said first reflector as said first and second displacement signals, the first reflector serving to reflect the first and second displacement signals along said first signal path back to said first ultrasonic transducer, for detection by the latter; and control means for controlling the operation of said first ultrasonic detection means, said control means including calculating means for receiving said first and second displacement signals for calculating therefrom and indicating the total volume displaced by at least said first and second pistons during a given dispensing cycle or operation.

13. The improvement of claim 12, wherein said reflector means further includes a third reflector adjacent to said first reflector, said third reflector having a face that is parallel to a portion of a face of said first transducer and at a predetermined distance therefrom, for reflecting a portion of the acoustical signals from said first transducer back thereto as calibration signals, for inclusion in the calculations made by said calculating means, for substantially eliminating errors in the calculated volume due to changes in the velocity of sound in the fluid during the measurement or dispensing period.

14. The improvement of claim 12, further including:
second ultrasonic detection means mounted within either said third or fourth cylinders for periodically providing successive third and fourth displacement signals indicative of the displacement of said third and fourth pistons within said third and fourth cylinders, respectively, between the times of occurrence of said third and fourth displacement signals as said pistons reciprocate therein over a given dispensing cycle; and said control means further including means for controlling the operation of said second ultrasonic detection means, said calculating means further receiving said third and fourth displacement signals for calculating therefrom, and from said first and second displacement signals, and indicating the total volume displaced by said first through fourth pistons during a given dispensing cycle or operation.

15. The improvement of claim 14, wherein said second ultrasonic detection means includes:
second ultrasonic transducer means for both transmitting successive ultrasonic pulses into the associated said third or fourth cylinder, and for receiving said third and fourth displacement signals in the form of ultrasonic signals reflected back from the associated one of either said third or fourth pistons; and
second reflector means for establishing a signal path between said second ultrasonic transducer means and the associated one of said third or fourth pistons.

16. The improvement of claim 15, further including:
said second ultrasonic transducer means including a first ultrasonic transducer mounted in an outermost side of the associated said third or fourth cylinder, for transmitting and receiving acoustic signals along a first signal path transverse to the longitudinal axis of the associated said third or fourth piston; and
said second reflector means being mounted within the associated said third or fourth cylinder, and including a first reflector mounted on the side wall of the associated said third or fourth cylinder opposite said second ultrasonic transducer, for reflecting transmitted signals from said first signal path to a second signal path parallel to the longitudinal axis of the associated said third or fourth piston, and a second reflector on the face of the associated said third or fourth piston for reflecting the signals back along said second signal path to said second reflector as said third and fourth displacement signals, the first reflector serving to reflect the third and fourth displacement signals along the associated said first signal path back to said second ultrasonic transducer, for detection by the latter.

17. The improvement of claim 16, wherein said second reflector means further includes a third reflector adjacent said first reflector, said third reflector having a face that is parallel to a portion of a face of said second transducer and at a predetermined distance therefrom, for reflecting a portion of the acoustical signals from said second transducer back thereto as calibration signals, for inclusion in the calculations made by said calculating means, for substantially eliminating errors in the calculated volume due to changes in the velocity of sound in the fluid during the measurement or dispensing period.

18. The improvement of claim 12, wherein said control means includes a microprocessor.

19. In a rotary positive displacement piston meter for metering or measuring the volume of fluid dispensed from a dispensing system, said rotary positive displacement piston meter includes first and second pistons mounted within first and second opposing cylinders, respectively, and third and fourth pistons mounted within third and fourth opposing cylinders, respectively, said first and second pistons reciprocating in opposition to one another within their respective cylinders, and said third and fourth pistons reciprocating in opposition to one another within their respective cylinders, each one of said first through fourth pistons move in a downstroke when fluid under external pressure is forced into their respective cylinder, and move in an upstroke to force fluid out of their respective cylinder for dispensing, the total volume displaced by the pistons within respective cylinders during a given dispensing cycle being equivalent to the total volume of fluid dispensed, wherein the improvement comprises:
first and second ultrasonic detection means mounted within said first and third cylinders for periodically providing first and second position signals indicative of the positions of said first and second pistons, and said third and fourth pistons, respectively, at various times as said pistons reciprocate within their associated said first through fourth cylinders, respectively, over a given measuring period for dispensing fluid, said first and second ultrasonic detection means including first and second ultrasonic transducer means, respectively, for both transmitting ultrasonic pulses into said first and third cylinders, respectively, and for receiving said first and second position signals reflected back from said first and third pistons, respectively, and first and second reflector means for establishing signal paths between said first ultrasonic transducer means and said first piston, and between said second ultrasonic transducer means and said third piston, respectively;

said first and second ultrasonic transducer means including first and second ultrasonic transducers, respectively, mounted in outermost side portions of said first and third cylinders, respectively, for transmitting and receiving acoustic signals along a first signal path transverse to the longitudinal axes of said first and third pistons, respectively;

said first and second reflector means being mounted within said first and third cylinders, respectively, and each of said first and second reflector means including a first reflector mounted on the side wall of said first and third cylinders, respectively, opposite said first and second ultrasonic transducers, respectively, for reflecting transmitted signals from said first signal path to a second signal path parallel to the longitudinal axes of said first and third pistons, respectively, and a second reflector on the face of each of said first and third pistons, respectively, for reflecting the associated signals back along said second signal paths to said first reflectors, respectively, as said first position signals, the first reflectors serving to reflect the first position signals along said first signal paths back to said first and second ultrasonic transducers, respectively, for detection by the latter two; and control means for controlling the operation of said first and second ultrasonic detection means, said control means including calculating means for receiving said first and second position signals for calculating and indicating the total volume displaced by said first through fourth pistons during the measuring or dispensing period.

20. The improvement of claim 19, wherein said reflector means further includes third reflectors adjacent each one of said first reflectors, said third reflectors each having a face that is parallel to a portion of a face of each one of said first and second transducers, respectively, and at a predetermined distance therefrom, for reflecting a portion of the acoustical signals from said first and second transducers, respectively, back thereto as calibration signals, for inclusion in the calculations made by said calculating means, for substantially eliminating errors in the calculated volume due to changes in the velocity of sound in the fluid during the measurement or dispensing period.

21. The improvement of claim 20, wherein said control means includes a microprocessor.

* * * * *